Feb. 9, 1937.  J. W. MECKLENBURGER  2,070,018
MOUNTING FOR TIMEPIECES
Filed May 5, 1934
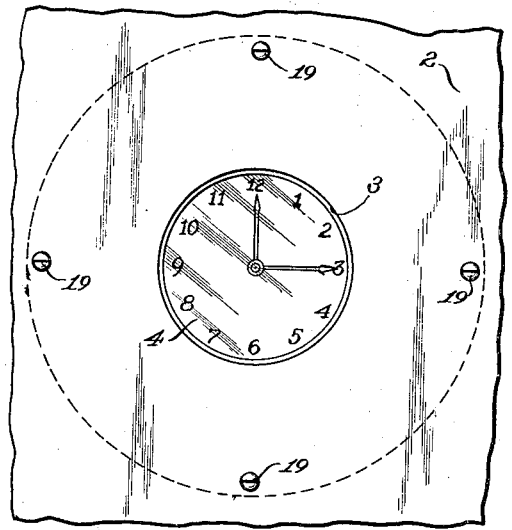
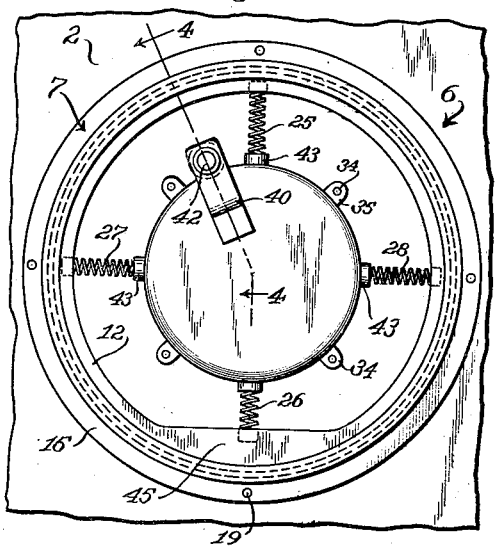
Inventor;
Jerome W. Mecklenburger
By Jones, Addington, Ames & Seibold
Attys.

Patented Feb. 9, 1937

2,070,018

UNITED STATES PATENT OFFICE 2,070,018

MOUNTING FOR TIMEPIECES

Jerome W. Mecklenburger, Winnetka, Ill.

Application May 5, 1934, Serial No. 724,014

5 Claims. (Cl. 248—27)

This invention relates to mountings for time pieces and more particularly to a new and improved mounting or support for time-pieces or clocks used on motor-driven vehicles or the like.

It is well known that time pieces on motor-driven vehicles are of great utility and convenience. Experience shows that the vibrations of a vehicle, the side rolling of the vehicle traveling over rough roads, and the road dirt and grease that accumulate, all tend to make a time-piece short-lived. I find that by employing a mounting of the proper construction the vibrations of the vehicle and the shocks imparted to the time mechanism, including the side rolling of the vehicle caused by uneven roads, may be absorbed without damaging the delicate time mechanism and without exposing the same to the dirt, grit and grease.

An object of the invention is, therefore, to provide a mounting of this type capable of absorbing or otherwise compensating for mechanical shocks imparted to time-pieces by the jarring and rocking of the vehicle, which shocks tend to injure the delicate mechanism of the time-pieces.

A further object of the invention is to provide a mounting for time-pieces to be used on motor-driven vehicles which will suitably encase the time piece and protect it against dirt and grease.

Specifically, these objects are obtained preferably by providing an opening say in the panel comprising the dash or instrument board of an automobile and attaching a frame at the rear of the opening, which may be constructed to form a channel or raceway for a ring revolvably riding therein to absorb shocks imparted thereto by side rolling of the vehicle chassis or otherwise. The time-piece may then be suspended within the ring opposite the panel opening by a plurality of springs adapted to absorb vibrations or jarring in horizontal and vertical directions, while a ballast may be provided to return the ring in its raceway to normal position as the ring tends to roll therein when acting to absorb shocks or vibrations due to a rolling action of the vehicle.

Further objects and advantages of the present invention will be apparent to those skilled in the art when taken in connection with the accompanying drawing which forms a part thereof.

In the drawing,

Figure 1 is a fragmentary detailed elevation of a dash or panel board, or other suitable location, of a motor-driven vehicle embodying the present invention;

Fig. 2 is a rear view of the mechanism shown in Fig. 1;

Fig. 3 is an exploded perspective view, being partly in section, of the parts comprising this mechanism;

Fig. 4 is a vertical sectional view taken on line 4—4 of Fig. 2;

Figs. 5 and 6 are detail sectional views of an alternative embodiment of the invention employing anti-friction bearings at spaced points about the periphery of the ring, Fig. 6 being taken on line 6—6 of Fig. 5.

Referring first to Figures 1 to 4, inclusive, the invention is shown in its specific embodiment as applied to a motor-driven vehicle, and particularly to the dash or panel board thereof, although the invention may obviously be suited for other uses and applications.

The construction shown comprises a dash or panel board 2 of a motor-driven vehicle having an opening 3 formed therein to receive the front face 4 of a time-piece 5 suitably suspended at the rear of this opening 3 by mechanism to be presently described. Although the opening is shown circular, it will be apparent that it is within the scope of the present invention to make it any suitable shape to correspond to the contour of the time-piece face 4.

The mounting for supporting the time-piece 5 adjacent opening 3, and preferably with the face 4 fitting into opening 3, comprises a frame 6 attached to instrument board 2 at the rear. Frame 6 may be of any suitable construction, but I have found it expedient and simple in construction and assembly to provide two members 7 and 8 each having an inner radial flange, designated 9 and 10, respectively, spaced from each other, the flange 10 also being spaced from the rear of the instrument panel 2. Spacing legs 9 and 10 apart forms a channel or raceway 11 in which an anti-friction ring 12 is adapted to revolve. It will be understood that the ring 12 may be of any anti-friction material which may revolve freely in channel 11 to compensate for any rolling action of the vehicle, or it may be provided with an anti-friction band 13 interposed, as shown in Fig. 4, if desired. The frame members 7 and 8 are held together at any number of points, say by screws 19 that may enter the instrument board 2 from the front and pass through outer radial flanges 15 and 16 of frame members 7 and 8 with washers 14 inserted therebetween.

If so desired, any form of bearing may be used. Figures 5 and 6 illustrate ball bearings 21 shown in a raceway 22 formed by providing opposing shoulders 23 and 24 on the frame member 7 and ring 12.

The time-piece 5 is suspended within ring 12 by means of a plurality of suitable springs 25, 26, 27, and 28 arranged to carry the weight of the time-piece, and to be resilient in all directions for absorbing vibrations or jarring of the vehicle. Springs 25 and 26 may be disposed in the vertical axis and springs 27 and 28 may be disposed in the horizontal axis of anti-friction ring 12. It will be apparent that these springs may still function in the manner desired, although disposed in other positions.

To exclude road dust, dirt and car grease from entering the interior of the time piece 5, which usually accumulate on time-pieces employed on motor vehicles, a split casing 30 is preferably provided with its parts 31 and 32 detachably secured together, say by screws 35 entering threaded apertured ears 34. The usual winding stem 36 may project through casing 30 and have its cog 37 meshing with a cog 38 carried on a stem 39 supported in a bearing bracket 40, suitably secured in rigid relation to part 31 of split casing 30. The outer free end of stem 39 has a manually operable knurled head 42, which may be engaged manually for winding the time piece 5. The mechanism above described and carrying time piece 5 in suspended relation to the rear of but in registration with opening 3 in the dash or instrument board 2, is preferably designed to be located at the rear of the dash board 2 so that the attendant or driver of the motor vehicle may conveniently reach under and to the rear of this dash board 2 for engaging the knurled head 42 to wind the time-piece 5.

Springs 25 to 28, inclusive, may be carried in any convenient and expedient manner to serve their purpose, but, as shown in Figs. 2 and 3, anti-friction ring 12 may be provided with a series of recesses 44 into which the outer ends of these springs are inserted, while the parts 31 and 32 of the split casing may have formed thereon corresponding sockets 43 into which the inner ends of the springs are inserted.

It will be understood, of course, that these springs 25 to 28, inclusive, may fit snugly in recesses 44 and sockets 43, or may be attached therein to prevent their displacement.

The object of employing springs 25 to 28, inclusive, is to provide for the necessary resiliency in action in all directions, and not in a vertical direction only as such springs can take up not only vertical stresses or vibrations but also those in a horizontal direction, and rotary direction, or in a combination of these directions.

Anti-friction ring 12 is provided at its lowermost point with increased mass or weight indicated at 45 to act as a counterpoise or ballast. Weight 45 will act to return anti-friction ring 12 to its normal position of rest in frame 6. Vibrations of a motor vehicle traveling over a rough road are of a complicated character. Uneven surfaces crosswise of the road causes the front wheels of the vehicle to move in different transverse planes or positions and the chassis of the vehicle to roll or rock transversely. Springs 25 to 28, inclusive, may tend to eliminate the transmission of a portion of vibration resulting from this cause, but anti-friction ring 12, riding in channel 11 in frame 6, together with these springs, will provide a construction that is unusually sensitive to vibration and will absorb or take up vibrations of any magnitude, occurring in any one or combination of directions. If the vibration is quick and of a magnitude to cause springs 25 to 28 to flex considerably, anti-friction ring 12 will act to ease the action of the springs 25 to 28, inclusive, and prevent any recoil through the springs tending to injure the delicate mechanism of time-piece 5. The ballast 45 assures the return of anti-friction ring 12 to normal position so that the face 4 of time-piece 5 will be properly positioned at all times.

It will be noted that the mechanism is of a design permitting the handling of the parts as a unitary assembly, being capable of easy and quick attachment to the rear of the panel or instrument board of a motor vehicle. Moreover, the mechanism is of a design that will admit of ready attachment to practically any part of the motor vehicle without hampering free access to the winding stem.

Without further elaboration, the foregoing will so fully explain the gist of my invention, that others may, by applying current knowledge, readily adopt the same for use under varying conditions of service, without eliminating certain features which may properly be said to constitute the essential items of novelty involved, which items are intended to be defined and secured to me by the following claims:

I claim:

1. In a mounting for time-pieces on motor driven vehicles, the combination of a base support having an opening therein, an anti-friction ring member in said opening, a plurality of springs centrally positioning a time-piece within said ring member, and a ballast member secured to the base of said ring for vertically centering said ring member in said opening.

2. In combination with a panel on the chassis of a motor-driven vehicle having an opening therein, a mounting for vertically supporting a time-piece in a plane parallel to and adjacent said opening including a frame attached to said panel, said frame being constructed to form a channel serving as a raceway, a ring riding in said raceway, a ballast at the base of said ring for returning said ring to its normal position in said raceway, said time-piece being positioned within said ring opposite to said panel opening, and a plurality of horizontal and vertical springs for attaching said time-piece within said ring.

3. In combination with a panel on the chassis of a motor-driven vehicle having an opening therein, a mounting for supporting a time-piece in a plane parallel to and adjacent said opening including a frame attached to said panel, said frame being formed of several members secured to said panel so as to form a channel, a ring fitting in said channel in non-frictional relation whereby to revolve therein, a ballast at the base of said ring for returning said ring to its normal position in said channel, said time-piece being positioned within said ring opposite to said panel opening, and spring means for suspending said time-piece within said ring.

4. In a device of the character described, a panel having an opening therein, a substantially circular frame secured to the rear of said panel concentric to said opening, said frame comprising a pair of members having inwardly extending spaced radial flanges, said flanges forming a raceway to the rear of said opening when said frame is secured to said panel, a freely movable ring riding in said raceway in non-frictional relation, a time piece, a plurality of springs for supporting said time piece centrally within said ring, and a ballast formed in said ring at its lower end whereby to center said ring substantially vertically in said raceway and to keep said time piece in a vertical upright position in said opening.

5. In a device of the class described, a panel having an opening therein, an open frame secured to said panel substantially concentric to said opening to support a time piece and expose only its face at said opening, said frame being formed of members assembled together to form a raceway, a ring carried in nonfrictional relation in said raceway so as to freely revolve and prevent transverse vibrations being transmitted to said time piece, a series of springs suspending said time piece within said ring to absorb vibrations other than said transverse vibrations, and a ballast formed at the bottom of said ring to return said ring to its normal position after being revolved by said transverse vibrations whereby to keep said time piece in a vertical upright position in said opening.

JEROME W. MECKLENBURGER.